(12) United States Patent
Kim et al.

(10) Patent No.: US 8,498,974 B1
(45) Date of Patent: Jul. 30, 2013

(54) REFINING SEARCH RESULTS

(75) Inventors: Hyung-Jin Kim, Sunnyvale, CA (US); Oleksandr Grushetskyy, Cupertino, CA (US); Andrei Lopatenko, Cupertino, CA (US)

(73) Assignee: Google Inc., Mountain View, CA (US)

(*) Notice: Subject to any disclaimer, the term of this patent is extended or adjusted under 35 U.S.C. 154(b) by 353 days.

(21) Appl. No.: 12/551,052

(22) Filed: Aug. 31, 2009

(51) Int. Cl.
*G06F 17/30* (2006.01)
*G06F 17/00* (2006.01)

(52) U.S. Cl.
USPC .................. 707/706; 707/748; 707/722

(58) Field of Classification Search
USPC .......................... 707/706, 748, 772
See application file for complete search history.

(56) References Cited

U.S. PATENT DOCUMENTS

| | | | |
|---|---|---|---|
| 5,265,065 A | 11/1993 | Turtle | |
| 5,488,725 A | 1/1996 | Turtle | |
| 5,696,962 A | 12/1997 | Kupiec | |
| 5,920,854 A | 7/1999 | Kirsch et al. | |
| 5,963,940 A | 10/1999 | Liddy et al. | |
| 6,006,222 A | 12/1999 | Culliss | |
| 6,014,665 A | 1/2000 | Culliss | |
| 6,026,388 A | 2/2000 | Liddy et al. | |
| 6,067,565 A | 5/2000 | Horvitz | |
| 6,078,916 A | 6/2000 | Culliss | |
| 6,078,917 A * | 6/2000 | Paulsen et al. ............ 1/1 | |
| 6,088,692 A | 7/2000 | Driscoll | |
| 6,134,532 A | 10/2000 | Lazarus et al. | |
| 6,182,068 B1 | 1/2001 | Culliss | |
| 6,185,559 B1 | 2/2001 | Brin et al. | |
| 6,249,252 B1 | 6/2001 | Dupray | |
| 6,285,999 B1 | 9/2001 | Page | |
| 6,321,228 B1 | 11/2001 | Crandall et al. | |
| 6,327,590 B1 | 12/2001 | Chidlovskii et al. | |
| 6,341,283 B1 | 1/2002 | Yamakawa et al. | |
| 6,353,849 B1 | 3/2002 | Linsk | |
| 6,363,378 B1 | 3/2002 | Conklin et al. | |
| 6,370,526 B1 | 4/2002 | Agrawal et al. | |

(Continued)

FOREIGN PATENT DOCUMENTS

| | | |
|---|---|---|
| WO | WO 00/77689 | 12/2000 |
| WO | WO 01/16807 | 3/2001 |
| WO | WO 01/67297 | 9/2001 |
| WO | WO 2004/059514 | 7/2004 |

OTHER PUBLICATIONS

U.S. Appl. No. 10/726,345, filed Dec. 3, 2003, Pearson et al., System and Methods for Improved Searching.

(Continued)

*Primary Examiner* — Yicun Wu
(74) *Attorney, Agent, or Firm* — Fish & Richardson P.C.

(57) ABSTRACT

A computer-implemented method for processing query information includes receiving data representative of a search query from a user search session. The method also includes identifying a plurality of search results based upon the search query. Each search result is associated with a plurality of user characteristics and data that represents requestor behavior relative to previously submitted queries associated with the respective search result. The method also includes ordering the plurality of user characteristics based upon the data that represents requestor behavior relative to previously submitted queries and the respective search result. The method also includes adjusting the ordered plurality of user characteristics based upon at least one predefined compatibility associated with the user characteristics. The method also includes ranking the search results based upon the adjusted plurality of user characteristics.

30 Claims, 7 Drawing Sheets

U.S. PATENT DOCUMENTS

| | | |
|---|---|---|
| 6,480,843 B2 | 11/2002 | Li |
| 6,490,575 B1 | 12/2002 | Berstis |
| 6,526,440 B1 | 2/2003 | Bharat |
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,615,209 B1 | 9/2003 | Gomes |
| 6,623,529 B1 | 9/2003 | Lakritz |
| 6,658,423 B1 | 12/2003 | Pugh et al. |
| 6,671,681 B1 | 12/2003 | Emens et al. |
| 6,678,681 B1 | 1/2004 | Brin et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,816,850 B2 | 11/2004 | Culliss |
| 6,853,993 B2 | 2/2005 | Ortega et al. |
| 6,873,982 B1 | 3/2005 | Bates et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,912,505 B2 | 6/2005 | Linden et al. |
| 6,944,611 B2 | 9/2005 | Flank et al. |
| 6,944,612 B2 | 9/2005 | Roustant et al. |
| 6,954,750 B2 | 10/2005 | Bradford |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 | 9/2006 | Chou et al. |
| 7,117,206 B1 | 10/2006 | Bharat et al. |
| 7,136,849 B2 | 11/2006 | Patrick |
| 7,146,361 B2 | 12/2006 | Broder et al. |
| 7,222,127 B1 | 5/2007 | Bem et al. |
| 7,231,399 B1 | 6/2007 | Bem et al. |
| 7,243,102 B1 | 7/2007 | Naam et al. |
| 7,266,765 B2 | 9/2007 | Golovchinsky et al. |
| 7,293,016 B1 | 11/2007 | Shakib et al. |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,516,146 B2 | 4/2009 | Robertson et al. |
| 7,533,092 B2 | 5/2009 | Berkhin et al. |
| 7,552,112 B2 | 6/2009 | Jhala et al. |
| 7,565,363 B2 | 7/2009 | Anwar |
| 7,565,367 B2 | 7/2009 | Barrett et al. |
| 7,566,363 B2 | 7/2009 | Starling et al. |
| 7,574,530 B2 * | 8/2009 | Wang et al. ............... 709/245 |
| 7,584,181 B2 | 9/2009 | Zeng et al. |
| 7,610,282 B1 | 10/2009 | Datar et al. |
| 7,636,714 B1 | 12/2009 | Lamping et al. |
| 7,657,626 B1 | 2/2010 | Zwicky |
| 7,680,775 B2 | 3/2010 | Levin et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,783,632 B2 | 8/2010 | Richardson et al. |
| 7,801,885 B1 | 9/2010 | Verma |
| 7,809,716 B2 | 10/2010 | Wang et al. |
| 7,818,320 B2 * | 10/2010 | Makeev ............... 707/730 |
| 7,836,058 B2 | 11/2010 | Chellapilla et al. |
| 7,844,589 B2 | 11/2010 | Wang et al. |
| 7,849,089 B2 | 12/2010 | Zhang et al. |
| 7,853,557 B2 | 12/2010 | Schneider et al. |
| 7,860,886 B2 | 12/2010 | Loftesness |
| 7,877,404 B2 | 1/2011 | Achan et al. |
| 7,895,177 B2 * | 2/2011 | Wu ............... 707/706 |
| 7,925,498 B1 | 4/2011 | Baker et al. |
| 7,974,974 B2 | 7/2011 | Tankovich et al. |
| 7,987,185 B1 | 7/2011 | Mysen et al. |
| 8,019,650 B2 | 9/2011 | Donsbach et al. |
| 8,024,326 B2 | 9/2011 | Tong et al. |
| 8,024,330 B1 | 9/2011 | Franco et al. |
| 8,037,042 B2 | 10/2011 | Anderson et al. |
| 8,037,043 B2 | 10/2011 | Zoeter et al. |
| 8,051,061 B2 * | 11/2011 | Niu et al. ............... 707/706 |
| 8,060,497 B1 | 11/2011 | Zatsman et al. |
| 8,069,182 B2 | 11/2011 | Pieper |
| 8,073,263 B2 | 12/2011 | Hull et al. |
| 8,073,772 B2 | 12/2011 | Bishop et al. |
| 8,090,717 B1 | 1/2012 | Bharat et al. |
| 8,156,111 B2 | 4/2012 | Jones et al. |
| 8,224,827 B2 | 7/2012 | Dean et al. |
| 2001/0000356 A1 | 4/2001 | Woods |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1 | 1/2003 | Boerner |
| 2003/0018707 A1 | 1/2003 | Flocken |
| 2003/0028529 A1 | 2/2003 | Cheung et al. |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 | 9/2003 | Odom et al. |
| 2003/0195877 A1 | 10/2003 | Ford et al. |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1 | 1/2004 | Loofbourrow |
| 2004/0006740 A1 | 1/2004 | Krohn et al. |
| 2004/0034632 A1 | 2/2004 | Carmel et al. |
| 2004/0059708 A1 | 3/2004 | Dean et al. |
| 2004/0093325 A1 | 5/2004 | Banerjee et al. |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0186996 A1 | 9/2004 | Gibbs et al. |
| 2004/0199419 A1 | 10/2004 | Kim et al. |
| 2004/0215607 A1 | 10/2004 | Travis, Jr. |
| 2005/0015366 A1 | 1/2005 | Carrasco et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0102282 A1 | 5/2005 | Linden |
| 2005/0125376 A1 | 6/2005 | Curtis et al. |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0222998 A1 | 10/2005 | Driessen et al. |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0047643 A1 | 3/2006 | Chaman |
| 2006/0069667 A1 | 3/2006 | Manasse et al. |
| 2006/0089926 A1 | 4/2006 | Knepper et al. |
| 2006/0095421 A1 | 5/2006 | Nagai et al. |
| 2006/0106793 A1 | 5/2006 | Liang |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0200556 A1 | 9/2006 | Brave et al. |
| 2006/0230040 A1 | 10/2006 | Curtis et al. |
| 2007/0005575 A1 | 1/2007 | Dai et al. |
| 2007/0005588 A1 | 1/2007 | Zhang et al. |
| 2007/0038659 A1 | 2/2007 | Datar et al. |
| 2007/0061211 A1 | 3/2007 | Ramer et al. |

| | | |
|---|---|---|
| 2007/0081197 A1 | 4/2007 | Omoigui |
| 2007/0106659 A1 | 5/2007 | Lu et al. |
| 2007/0112730 A1 | 5/2007 | Gulli et al. |
| 2007/0130370 A1 | 6/2007 | Akaezuwa |
| 2007/0156677 A1 | 7/2007 | Szabo |
| 2007/0192190 A1 | 8/2007 | Granville |
| 2007/0214131 A1 | 9/2007 | Cucerzan et al. |
| 2007/0233653 A1 | 10/2007 | Biggs et al. |
| 2007/0255689 A1 | 11/2007 | Sun et al. |
| 2007/0260597 A1 | 11/2007 | Cramer |
| 2007/0266021 A1 | 11/2007 | Aravamudan et al. |
| 2007/0266439 A1 | 11/2007 | Kraft |
| 2007/0288450 A1 | 12/2007 | Datta et al. |
| 2008/0010143 A1 | 1/2008 | Kniaz et al. |
| 2008/0027913 A1 | 1/2008 | Chang et al. |
| 2008/0052219 A1 | 2/2008 | Sandholm et al. |
| 2008/0052273 A1 | 2/2008 | Pickens |
| 2008/0059453 A1 | 3/2008 | Laderman |
| 2008/0077570 A1 | 3/2008 | Tang et al. |
| 2008/0082518 A1 | 4/2008 | Loftesness |
| 2008/0091650 A1 | 4/2008 | Fontoura et al. |
| 2008/0114624 A1 | 5/2008 | Kitts |
| 2008/0114729 A1 | 5/2008 | Raman et al. |
| 2008/0114750 A1 | 5/2008 | Saxena et al. |
| 2008/0140699 A1 | 6/2008 | Jones et al. |
| 2008/0162475 A1 | 7/2008 | Meggs et al. |
| 2008/0183660 A1 | 7/2008 | Szulczewski |
| 2008/0189269 A1 | 8/2008 | Olsen |
| 2008/0208825 A1 | 8/2008 | Curtis et al. |
| 2008/0228442 A1 | 9/2008 | Lippincott et al. |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0012969 A1 | 1/2009 | Rail et al. |
| 2009/0055392 A1 | 2/2009 | Gupta et al. |
| 2009/0157643 A1 | 6/2009 | Gollapudi et al. |
| 2009/0182723 A1 | 7/2009 | Shnitko et al. |
| 2009/0287656 A1 | 11/2009 | Bennett |
| 2010/0106706 A1 | 4/2010 | Rorex et al. |
| 2010/0131563 A1 | 5/2010 | Yin |
| 2010/0205541 A1 | 8/2010 | Rapaport et al. |
| 2010/0241472 A1 | 9/2010 | Hernandez |
| 2011/0295844 A1 | 12/2011 | Sun et al. |
| 2012/0191705 A1 | 7/2012 | Tong et al. |

OTHER PUBLICATIONS

U.S. Appl. No. 10/878,926, filed Jun. 28, 2004, Battle et al., Systems and Methods for Deriving and Using an Interaction Profile.

U.S. Appl. No. 11/556,086, filed Nov. 2, 2006, Diligenti et al., Search Result Inputs Using Stop Word Generalized Queries.

U.S. Appl. No. 11/556,100, filed Nov. 2, 2006, Diligenti et al., Search Result Inputs Using Variant Generalized Queries.

U.S. Appl. No. 11/556,143, Nov. 2, 2006, filed Kim et al., Modifying Search Result Ranking Based on Implicit User Feedback.

U.S. Appl. No. 11/647,888, filed Dec. 29, 2006, Baker et al., Ensuring That a Synonym for a Query Phrase Does Not Drop Information Present in the Query Phrase.

U.S. Appl. No. 11/651,282, filed Jan. 9, 2007, Heymans, Method and Apparatus for Automatically Identifying Compounds.

U.S. Appl. No. 11/685,095, filed Mar. 12, 2007, Kim et al., Modifying Search Result Ranking Based on Implicit User Feedback and a Model of Presentation Bias.

U.S. Appl. No. 11/686,288, filed Mar. 14, 2007, Diligenti et al., Detecting Click Spam.

U.S. Appl. No. 11/742,447, filed Apr. 30, 2007, Stets et al., Modifying Search Result Ranking Based on a Temporal Element of User Feedback.

U.S. Appl. No. 11/781,155, filed Jul. 20, 2007, Diligenti et al., Search Result Inputs Using Generalized Queries.

U.S. Appl. No. 11/841,313, filed Aug. 20, 2007, Corduneanu et al., Modifying Search Result Ranking Based on Populations.

U.S. Appl. No. 11/870,893, filed Oct. 11, 2007, McDonnell, Time Based Ranking.

U.S. Appl. No. 12/166,617, filed Jul. 2, 2008, Yang, Determining Whether Numbers In Different Language Formats Are Synonymous.

U.S. Appl. No. 12/166,718, filed Jul. 2, 2008, Upstill et al., Identifying Common Co-Occurring Elements in Lists.

U.S. Appl. No. 12/331,872, filed Dec. 10, 2008, Ie et al., Sharing Search Engine Relevance Data Between Corpora.

U.S. Appl. No. 12/572,739, filed Oct. 2, 2009, McDonnell et al., Recent Interest Based Relevance Scoring.

U.S. Appl. No. 12/506,203, filed Jul. 20, 2009, Tong et al., Generating a Related Set of Documents for an Initial Set of Documents.

U.S. Appl. No. 12/717,064, filed Mar. 3, 2010, Kuramochi et al., Framework for Testing Search Result Hypotheses.

U.S. Appl. No. 12/632,279, filed Dec. 7, 2009, Serboncini et al., Dentification and Uses of Search Entity Transition Probabilities.

U.S. Appl. No. 12/756,749, filed Apr. 8, 2010, Lopatenko et al, Ranking Search Results Based on Similar Queries.

U.S. Appl. No. 12/723,973, filed Mar. 15, 2010, Nerurkar, Ranking Search Results Based on Anchors.

U.S. Appl. No. 12/717,475, filed Mar. 4, 2010, Thakur, et al., Deriving Site Reputation and Focus from User Feedback Statistics.

U.S. Appl. No. 12/623,276, filed Nov. 20, 2009, Kim et al., Modifying Scoring Data Based on Historical Changes.

U.S. Appl. No. 12/699,549, filed Feb. 3, 2010, Fernandes et al., Evaluating Website Properties by Partitioning User Feedback.

U.S. Appl. No. 12/718,634, filed Mar. 5, 2010, Kim et al., Temporal-Based Score Adjustments.

U.S. Appl. No. 12/842,345, filed Jul. 23, 2010, Chen et al., Combining User Feedback.

U.S. Appl. No. 12/982,633, filed Dec. 30, 2010, Adams et al., Modifying Ranking Data Based on Document Changes.

U.S. Appl. No. 13/310,901, filed Dec. 5, 2011, Kim et al., Refining Search Results.

U.S. Appl. No. 13/476,875, filed May 21, 2012, Lopatenko et al, Ranking Search Results Based on Similar Queries.

Bar-Llan et al., "Presentation Bias is Significant in Determining User Preference for Search Results—A User Study"; Journal of the American Society for Information Science and Technology, vol. 60, Issue 1 (p. 135-149), Sep. 2008, 15 pages.

Bar-Llan et al.; "Methods for comparing rankings of search engine results"; Computer Networks: The International Journal of Computer and Telecommunications Networking, Jul. 2006, vol. 50, Issue 10, 19 pages.

Burke, Robin, Integrating Knowledge-based and Collaborative-filtering Recommender Systems, AAAI Technical report WS-99-01. Complilation copyright © 1999, AAAI (www.aaai.org), pp. 69-72.

Craswell, et al.; *Random Walks on the Click Graph*; Jul. 2007; SIGIR '07, Amsterdam, the Netherlands, 8 pages.

Google News archive, Jul. 8, 2003, Webmasterworld.com, [online] Retrieved from the Internet http://www.webmasterwolrd.com/forum3/15085.htm [retrieved on Nov. 20, 2009] 3 pages.

Grčar, Miha, *User Profiling: Collaborative Filtering*, SIKDD 2004, Oct. 12-15, 2004, Ljubljana, Slovenia, 4 pages.

Nicole, Kristen, *Heeii is StumbleUpon Plus Google Suggestions*, [online], Retrieved from the Internet http://mashable.com/2007/05/15/heeii//, 11 pages.

Radlinski, et al., *Query Chains: Learning to Rank from Implicit Feedback*, KDD '05, Aug. 21- 24, 2005, Chicago, Illinois, USA, 10 pages.

Agichtein, et al; Improving Web Search Ranking by Incorporating User Behavior Information; Aug. 2006; Proceedings of the Twenty-Ninth Annual International Acm Sigir Conference on Research and Development in Information Retrieval, p. 19-26.

Agichtein, et al; Learning User Interaction Models for Predicting Web Search Result Performances; Aug. 2006; Proceedings of the Twenty-Ninth Annual International Acm Sigir Conference on Research and Development in Information Retrieval, p. 3-10.

Bar-Llan et al., "Presentation Bias is Significant in Determining User Preference for Search Results - a User Study"; Journal of the American Society for Information Science and Technology, vol. 60, Issue 1 (p. 135-149), Sep. 2008, 15 pp.

Bar-Llan et al.; "Methods for comparing rankings of search engine results"; Computer Networks: the International Journal of Computer and Telecommunications Networking, Jul. 2006, vol. 50, Issue 10, 19 pp.

Boldi, et al.; the Query-flow Graph: Model and Applications; Ckim '08, Oct. 26-30, Napa Valley, California, Usa, pp. 609-617.
Boyan et al.; a Machine Learning Architecture for Optimizing Web Search Engines; Aug. 1996; Internet-based information systems-Workshop Technical Report-American Association for Artificial Intelligence, p. 1-8.
Burke, Robin, Integrating Knowledge-based and Collaborative-filtering Recommender Systems, Aaai Technical Report Ws-99-01. Compilation copyright 0 1999, Aaai (www.aaai.org), pp. 69-72.
Craswell, et al.; Random Walks on the Click Graph; Jul. 2007; Sigir '07, Amsterdam, the Netherlands, 8 pp.
Cutrell, et al.; *Eye tracking in MSN Search: Investigating snippet length, target position and task types*; 2007; Conference on Human Factors in Computing Systems—Proceedings of the SIGCHI Conference on Human Factors in Computing Systems.
Diligenti, et al., *Users, Queries and Documents: a Unified Representation for Web Mining*, wi-iat, vol. 1, 2009 IEEE/WIC/ACM International Joint Conference on Web Intelligence and Intelligent Agent Technology, 2009, pp. 238-244.
Hofmann, Thomas, *Latent Semantic Models for Collaborative Filtering*, ACM Transactions on Information Systems, vol. 22, No. 1, Jan. 2004, pp. 89-115.
Google News archive, Jul. 8, 2003, Webmasterworld.com, [online] Retrieved from the Internet http://www.webmasterworld.com/forum3/15085.htm [retrieved on Nov. 20, 2009] 3 pages.
Grčar, Miha, *User Profiling: Collaborative Filtering*, SIKDD 2004, Oct. 12-15, 2004, Ljubljana, Slovenia, 4 pages.
Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.
Joachims; *Optimizing search engines using clickthrough data*; 2002; Proceedings of the ACM SIGKDD International Conference on Knowledge Discovery and Data Mining, p. 133-142.
Joachims et al., "Search Engines that Learn from Implicit Feedback"; Aug. 2007, IEEE Computer Society.
Kelly, et al.; *Implicit Feedback for Inferring User Preference: A Bibliography*; SIGIR Forum, vol. 37, No. 2 (2003), pp. 18-28.
Linden, Greg et al., *Amazon.com Recommendations: Item-to-Item Collaborative Filtering*, [online], http://computer.org/internet/, IEEE Internet Computing, Jan.-Feb. 2003, IEEE Computer Society, pp. 76-80.
U.S. Patent Office, U.S. Appl. No. 11/556,143, filed Nov. 2, 2006, in Office Action mailed Jan. 25, 2010, 14 pages.
U.S. Patent Office, U.S. Appl. No. 11/556,143, filed Nov. 2, 2006, in Office Action mailed Jul. 6, 2010, 20 pages.
U.S. Patent Office, U.S. Appl. No. 11/556,143, filed Nov. 2, 2006, in Office Action mailed Apr. 20, 2011, 18 pages.
Nicole, Kristen, Heeii is StumbleUpon Plus Google Suggestions, [online], Retrieved from the Internet http://mashable.com/2007/05/15/heeii/, 11 pages.
Lemire, Daniel, *Scale and Translation Invariant Collaborative Filtering Systems*, Published in Information Retrieval, 8(1), pp. 129-150, 2005.
U.S. Patent Office, U.S. Appl. No. 11/685,095, filed Mar. 12, 2007, in Office Action mailed Feb. 8, 2010, 31 pages.
U.S. Patent Office, U.S. Appl. No. 11/685,095, filed Mar. 12, 2007, in Office Action mailed Feb. 25, 2009, 21 pages.
U.S. Patent Office, U.S. Appl. No. 11/685,095, filed Mar. 12, 2007, in Office Action mailed Sep. 10, 2009, 23 pages.
U.S. Patent Office, U.S. Appl. No. 11/685,095, filed Mar. 12, 2007, in Office Action mailed Apr. 13, 2011, 31 pages.
Radlinski, et al., *Query Chains: Learning to Rank from Implicit Feedback*, KDD '05, Aug. 21-24, 2005, Chicago, Illinois, USA, 10 pages.
U.S. Patent Office, U.S. Appl. No. 11/556,086, filed Nov. 2, 2006, in Office Action mailed Jun. 23, 2010, 21 pages.
Schwab, et al., *Adaptivity through Unobstrusive Learning*, 2002, 16(3), pp. 5-9.
Stoilova, Lubomira et al., *GiveALink: Mining a Semantic Network of Bookmarks for Web Search and Recommendation*, LinkKDD '05, Aug. 21, 2005, Chicago, IL, USA, 8 pages.
W3C, URIs, URLs and URNs: Classification and Recommendations 1.0, Report from the joint W3C/IETF URI Planning Interest Group, Sep. 21, 2001, 8 pages.
Xiao, et al., *Measuring Similarity of Interests for Clustering Web-Users*, ADC, 2001, pp. 107-114.
Xie et al., *Web User Clustering from Access Log Using Belief Function*, K-CAP '01, Oct. 22-23, 2001, Victoria, British Columbia, Canada, pp. 202-208.
Yu et al., *Selecting Relevant Instances for Efficient and Accurate Collaborative Filtering*, CIKM '01, Nov. 5-10, 2001, Atlanta, Georgia, pp. 239-246.
Zeng et al., *Similarity Measure and Instance Selection for Collaborative Filtering*, WWW '03, May 20-24, 2003, Budapest, Hungary, pp. 652-658.
Zeng, et al., "Learning to Cluster Web Search Results", SIGIR '04, Proceedings of the 27th Annual International ACM SIGIR conference on research and development in information retrieval, 2004.
Joachims, "Evaluating Search Engines Using Clickthrough Data", Cornell University, Department of Computer Science, Draft, Feb. 19, 2002, 13 pages.
Jansen et al., "An Analysis of Web Documents Retrieved and Viewed", School of Information Sciences and Technology, The Pennsylvania State University, the 4$^{th}$ International Conference on Internet Computing, Las Vegas, Nevada, pp. 65-69, Jun. 23-26, 2003, 5 pages.
Soumen Chakrabarti, et al. "Enhanced Topic Distillation using Text, Markup tags, and Hyperlinks" ACM, Sep. 9-12, 2001, pp. 208-216.
Gabriel Somlo et al., "Using Web Hepler Agent Profiles in Query Generation", ACM, Jul. 2003, pp. 812-818.
Australian Patent Office Non-Final Office Action in AU App. Ser. No. 2004275274, mailed Feb. 3, 2010, 2 pages.
Dan Olsen et al., "Query-by-critique: Spoken Language Access to Large Lists", ACM, Oct. 2002, pp. 131-140.
Susan Gauch et al., "A Corpus Analysis Approach for Automatic Query Expansion and its Extension to Multiple Databases", ACM, Jul. 1999, pp. 250-269.
Nicolas Bruno et al., "Top-K Selection Queries over Relational Databases: Mapping Strategies and Performance Evaluation", ACM, Jun. 2002, pp. 153-187.
Ji-Rong Wen et al., "Query Clustering using User Logs", ACM, Jan. 2002, pp. 59-81.
Brin, S. and L. Page, The Anatomy of a Large-Scale Hypertextual Web Search Engine, Computer Science Department, Apr. 1998.
International Search Report and Written Opinion for Application No. PCT/US2004/029615, dated Jan. 19, 2005, 8 pages.
Hungarian Patent Office, International Search Report and Written Opinion for Application No. 200806756-3, dated Nov. 19, 2010 12 pages.
Authorized Officer Athina Nickitas-Etienne, International Preliminary Report and Written Opinion for Application No. PCT/US2004/029615, mailed Mar. 23, 2006.
Indian Office Action in Indian Application No. 686/KOLNP/2006, mailed Jun. 3, 2008, 2 pages.
Danish Search Report and Written Opinion for Application No. 200601630-7, dated Jun. 21, 2007, 15 pages.
Jones et al., "Pictures of Relevance: A Geometric Analysis of Similarity Measures", Journal of the American Society for Information Science, Nov. 1987, 23 pages.
Kaplan et al., "Adaptive Hypertext Navigation Based On User Goals and Context", User Modeling and User-Adapted Interaction 2, Sep. 1, 1993; pp. 193-220, 28 pages.
Liddy et al., "A Natural Language Text Retrieval System With Relevance Feedback", 16th National Online, May 2-6, 1995, 3 pages.

* cited by examiner

REFINING SEARCH RESULTS

BACKGROUND

The present disclosure relates to using data that represents previously submitted user queries to adjust search results.

Internet search engines aim to identify documents or other items that are relevant to a user's needs and to present the documents or items in a manner that is most useful to the user. Such activity often involves a fair amount of mind-reading—inferring from various clues what the user wants. Certain clues may be user specific. For example, knowledge that a user is making a request from a mobile device, and knowledge of the location of the device, can result in much better search results for such a user.

Clues about a user's needs may also be more general. For example, search results can have an elevated importance, or inferred relevance, if a number of other search results link to them. Such an approach to determining relevance may be premised on the assumption that, if authors of web pages felt that another web site was relevant enough to be linked to, then web searchers would also find the site to be particularly relevant. In short, the web authors "vote up" the relevance of the sites.

Other various inputs may be used instead of, or in addition to, such techniques for determining and ranking search results. For example, user reactions to particular search results or search result lists may be gauged, so that results on which users often click will receive a higher ranking. The general assumption under such an approach is that searching users are often the best judges of relevance, so that if they select a particular search result, it is likely to be relevant, or at least more relevant than the presented alternatives.

SUMMARY

This disclosure describes systems, methods and apparatus including computer program products for refining search results. In general, one or more aspects of the subject matter described in this specification can be embodied in one or more methods for processing query information. The methods include receiving data representative of a search query from a user search session. The methods also include identifying a plurality of search results based upon the search query. Each search result is associated with a plurality of user characteristics and data that represents requestor behavior relative to previously submitted queries associated with the respective search result. The methods also include ordering the plurality of user characteristics based upon the data that represents requestor behavior relative to previously submitted queries and the respective search result. The methods also include adjusting the ordered plurality of user characteristics based upon at least one predefined compatibility associated with the user characteristics. The methods also include ranking the search results based upon the adjusted plurality of user characteristics.

These and other embodiments can optionally include one or more of the following features. One or more of the predefined compatibilities may define two or more user languages as being compatible. Predefined compatibilities may also define two or more user locations as being compatible. Ordering the plurality of user characteristics may include computing, for each user characteristic, a fraction based upon the data that represents requestor behavior relative to previously submitted queries and the respective search result. Adjusting the ordered plurality of user characteristics may include reordering the plurality of user characteristics based upon a fraction that is based upon the data that represents requestor behavior relative to previously submitted queries and the respective search result. Adjusting the ordered plurality of user characteristics may include removing data associated with a user characteristic. Ranking the search results may include computing a score for each search result based upon the adjusted plurality of user characteristics. Adjusting the ordered plurality of user characteristics may include applying a weight to data that represents requestor behavior relative to previously submitted queries and the respective search result.

In general, one or more other aspects of the subject matter described in this specification can be embodied in one or more methods for processing query information. The methods include receiving data representative of a search query from a user search session. The methods also include identifying a plurality of search results based upon the search query. Each search result is associated with data that represents requestor behavior relative to previously submitted queries. The requestor behavior is associated with a plurality of languages used at a location of the user. For each search result, the methods include combining the data that represents requestor behavior that is associated the plurality of languages used at user location. The methods also include ranking the search results based upon the combined data that represents requestor behavior.

These and other embodiments can optionally include one or more of the following features. Combining the data that represents requestor behavior may include applying a weight to the data that represents requestor behavior relative to previously submitted queries for the plurality of languages. The location of the user may be associated with a country.

Particular embodiments of the described subject matter can be implemented to realize one or more of the following advantages. By defining particular user characteristics (e.g., user languages, user locations, etc.) as being compatible, information associated with previous searches may be exploited to accentuate or downplay the rankings of search results.

The details of one or more implementations are set forth in the accompanying drawings and the description below. Other features, aspects, and advantages will become apparent from the description, the drawings, and the claims.

DESCRIPTION OF THE DRAWINGS

Like reference numbers and designations in the various drawings indicate like elements.

DETAILED DESCRIPTION

Figure 1:
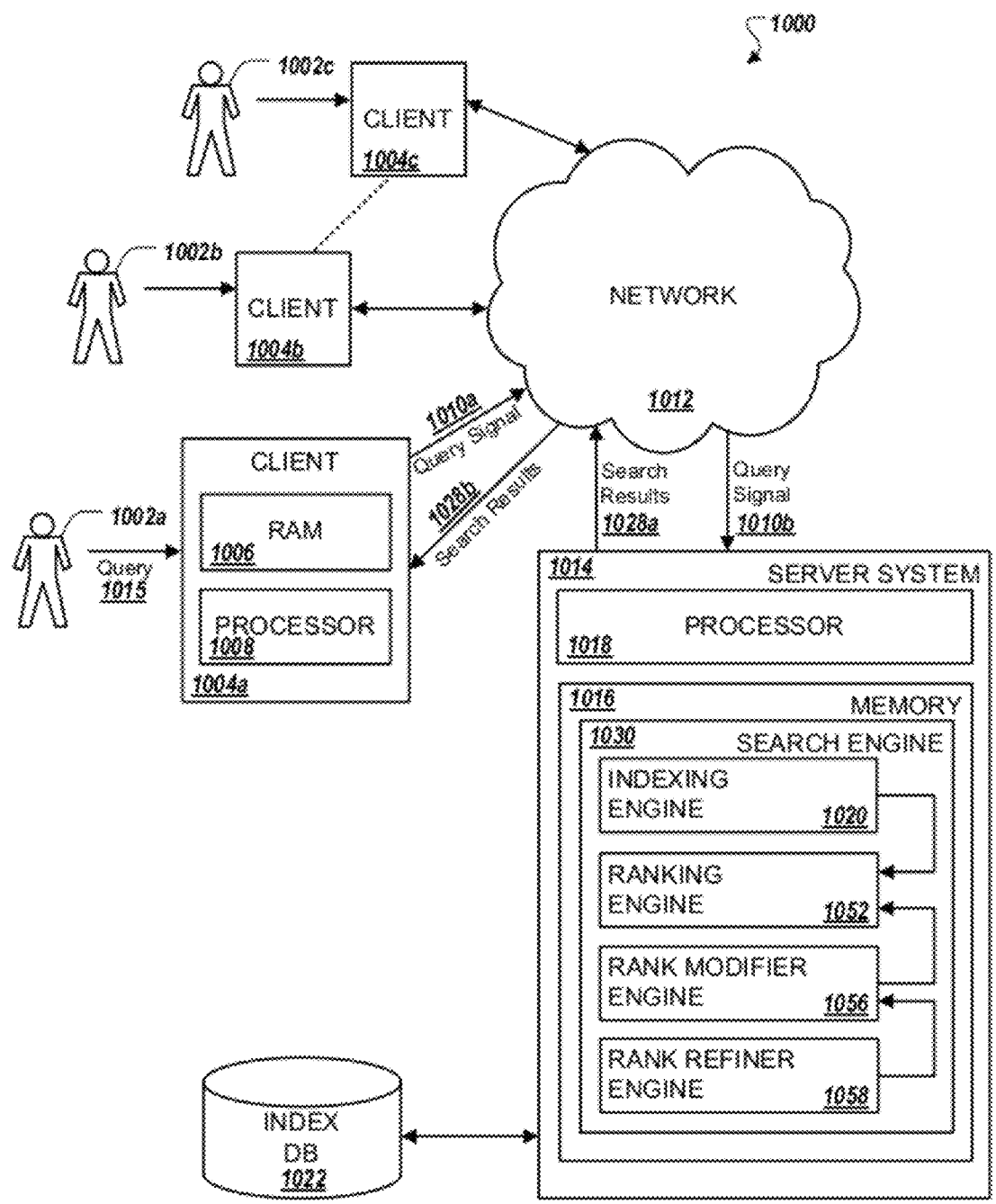
FIG. 1 shows an example information retrieval system.

FIG. 1 shows an example system 1000 for improving the relevance of results obtained from submitting search queries as can be implemented in an internet, intranet, or other client/server environment. The system 1000 is an example of an information retrieval system in which the systems, components and techniques described below can be implemented.

Although several components are illustrated, there may be fewer or more components in the system 1000. Moreover, the components can be distributed on one or more computing devices connected by one or more networks or other suitable communication mediums.

A user 1002 (1002a, 1002b, 1002c) can interact with the system 1000 through a client device 1004 (1004a, 1004b, 1004c) or other device. For example, the client device 1004 can be a computer terminal within a local area network (LAN) or wide area network (WAN). The client device 1004 can include a random access memory (RAM) 1006 (or other memory and/or a storage device) and a processor 1008. The processor 1008 is structured to process instructions within the system 1000. In some implementations, the processor 1008 is a single-threaded processor. In other implementations, the processor 1008 is a multi-threaded processor. The processor 1008 can include multiple processing cores and is structured to process instructions stored in the RAM 1006 (or other memory and/or a storage device included with the client device 1004) to display graphical information for a user interface.

A user 1002a can connect to a search engine 1030 within a server system 1014 to submit a query 1015. When the user 1002a submits the query 1015 through an input device attached to a client device 1004a, a client-side query signal 1010a is sent into a network 1012 and is forwarded to the server system 1014 as a server-side query signal 1010b. Server system 1014 can be one or more server devices in one or more locations. The server system 1014 includes a memory device 1016, which can include the search engine 1030 loaded therein. A processor 1018 is structured to process instructions within the system 1014. These instructions can implement one or more components of the search engine 1030. The processor 1018 can be a single-threaded processor or a multi-threaded processor, and can include multiple processing cores. The processor 1018 can process instructions stored in the memory 1016 related to the search engine 1030 and can send information to the client device 1004, through the network 1012, to create a graphical presentation in a user interface of the client device 1004 (e.g., a search results web page displayed in a web browser).

The server-side query signal 1010b is received by the search engine 1030. The search engine 1030 uses the information within the user query 1015 (e.g. query terms) to find relevant documents. The search engine 1030 can include an indexing engine 1020 that actively searches a corpus (e.g., web pages on the Internet) to index the documents found in that corpus, and the index information for the documents in the corpus can be stored in an index database 1022. This index database 1022 can be accessed to identify documents related to the user query 1015. Note that, an electronic document (which for brevity will simply be referred to as a document) does not necessarily correspond to a file. A document can be stored in a portion of a file that holds other documents, in a single file dedicated to the document in question, or in multiple coordinated files.

The search engine 1030 can include a ranking engine 1052 to rank the documents related to the user query 1015. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. The technique is exemplified in some systems that treat a link from one web page to another as an indication of quality for the latter page, so that the page with the most such quality indicators is rated higher than others. Appropriate techniques can also be used to identify and eliminate attempts to cast false votes so as to artificially drive up the relevance of a page.

To further improve such traditional document ranking techniques, the ranking engine 1052 can receive an additional signal from a rank modifier engine 1056 to assist in determining an appropriate ranking for the documents. The rank modifier engine 1056 provides one or more prior models, or one or more measures of relevance for the documents based on one or more prior models, which can be used by the ranking engine 1052 to improve the search results' ranking provided to the user 1002. In general, a prior model represents a background probability of document result selection given the values of multiple selected features, as described further below. The rank modifier engine 1056 can perform one or more of the operations to generate the one or more prior models, or the one or more measures of relevance based on one or more prior models.

Various types of information may be provided to the rank modifier engine 1056 for improving the ranking of documents. For example, information associated the search requester may be identified and used to adjust rankings of search results. Such information may include the language used by the search requester, the geographic location of the search requester, etc. Similar information associated with previous search requesters may also be used to adjust rankings. To identify such search requester information, and accordingly adjust rankings based on the information, the search engine 1030 can include a rank refiner engine 1058 that may implement one or more adjustment techniques. In one arrangement the rank modifier engine 1056 may modify rankings based on one of three distinct levels. At the first level, the rank modifier engine 1056 may rely upon information from similar queries previously initiated by search requesters using the same language and from the same general location (e.g., country) as the current search requester. If such information is lacking, the rank modifier 1056 may attempt to modify rankings at a second level. In one arrangement, the second level may allow additional information from previous searches to be used. For example, the second level may use information from similar queries previously initiated by search requesters that use the same language as the current search requester, but independent of the location of the previous search requesters. As such, additional useful information may become available by expanding the pool of previous search information. If a statistically significant amount of information is still absent, the rank modifier engine 1056 may further expand the pool to include data from all previous searches that were similar to the current search. As such, search information independent of search requester language and location may be used.

In some respects, such a three-level arrangement allows the rank modifier 1056 to exploit information shared by search requesters for ranking search results. However, by moving from one level to the next in such abrupt steps, other types of similarities among search requests may not be exploited. For example, similarities associated with user languages (e.g., Russian and Ukrainian) may be used for ranking search results. By recognizing the similarities in particular languages, information associated from previous searches for both languages may be exploited. For example, the rank modifier 1056 may be unable to identify previous search requests provided in Russian that are similar to a current Russian search request. As such, the rank modifier 1056 may elect to open the search pool to include previous searches independent of language. As such, some previous search requests in Ukrainian, which is similar to Russian, may be applied a similar weight (even if highly relevant) to another language (e.g., Chinese) that is very different from Russian, but for which a significant amount of search requests may exist. By taking language similarities into account, the rank refiner engine 1058 may allow previous search information to be exploited, which may provide more relevant result rankings for the search requester. Similar to accounting for language similarities such as compatibility, the rank refiner engine 1058 may also exploit other similarities associated with searchers. For example, similarities associated with searcher locations (e.g., country of the searcher) may be considered. In one some arrangements, similar geographical locations (e.g., bordering countries such as Mexico, Canada, the United States, etc.), locations with common culture and climate (e.g., northern African countries), or other types of similarities may be used for adjusting the rankings of search results. Further, such language and location similarities may be used to define additional levels that may be inserted between somewhat abrupt levels (e.g., between a common language level and a language independent level). To identify such similarities (e.g., compatible languages, similar locations), various types of information may be used. For example, search requester characteristics (e.g., language, location, etc.) may be provided by the search requestor (e.g., language used to provide a search request), or may be inferred by analyzing data related to the search request or a series of search requests, or determined in some other manner. Additionally, information related to interactions between the search requestor and search results (e.g., click data, refining queries, etc.) may be used. Data representing the similarities may be cataloged in a database (e.g., the index db 1022). From the information, search result scoring and ranking (e.g., as performed by the ranking engine 1052 and the rank modifier engine 1056) can be adjusted to account for such language, location and other types of similarities.

The search engine 1030 can forward the final, ranked result list within a server-side search results signal 1028a through the network 1012. Exiting the network 1012, a client-side search results signal 1028b can be received by the client device 1004a where the results can be stored within the RAM 1006 and/or used by the processor 1008 to display the results on an output device for the user 1002a.

Figure 2:
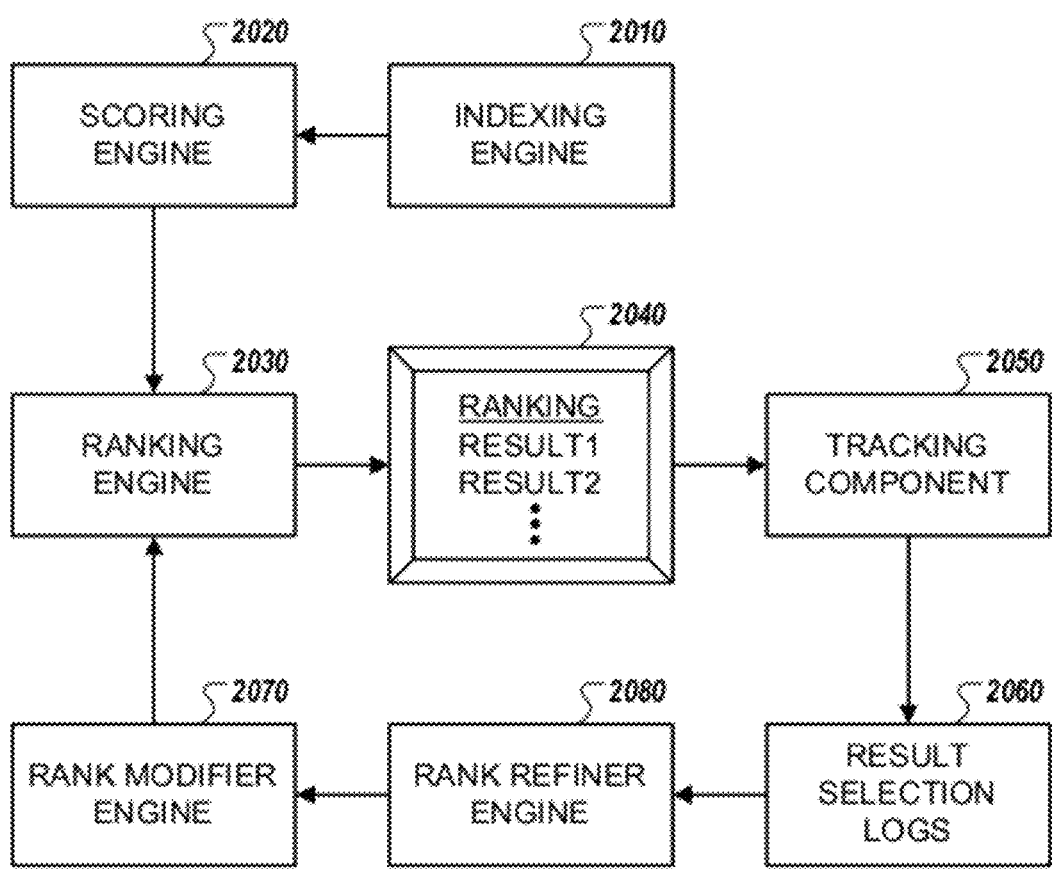
FIG. 2 shows example components of an information retrieval system.

FIG. 2 shows example components of an information retrieval system. These components can include an indexing engine 2010, a scoring engine 2020, a ranking engine 2030, a rank modifier engine 2070, and a rank refiner engine 2080. The indexing engine 2010 can function as described above for the indexing engine 1020. In addition, the scoring engine 2020 can generate scores for document results based on many different features, including content-based features that link a query to document results, and query-independent features that generally indicate the quality of document results. The content-based features can include aspects of document format, such as query matches to title or anchor text in an HTML (Hyper Text Markup Language) page. The query-independent features can include aspects of document cross-referencing, such as a rank of the document or the domain. Moreover, the particular functions used by the scoring engine 2020 can be tuned, to adjust the various feature contributions to the final IR score, using automatic or semi-automatic processes.

The ranking engine 2030 can produce a ranking of document results 2040 for display to a user based on IR scores received from the scoring engine 2020 and one or more signals from the rank modifier engine 2070. The rank modifier engine 2070 can adjust rankings at least in part based on data received from the rank refiner engine 2080. Along with being provided data from the result selection logs 2060, other sources may provide information to the rank refiner engine 2080. For example, queries entered into a user interface may be provided to the rank refiner engine 2080. In this particular example, the rank refiner engine 2080 provides information to the rank modifier engine 2070 for ranking adjustments, however other architectures may be implemented. For example, information may be provided by the rank refiner engine 2080 to the indexing engine 2010 or one or more other components of the information retrieval system. A tracking component 2050 can be used to record information regarding individual user selections of the results presented in the ranking 2040. For example, the tracking component 2050 can be embedded JavaScript code included in a web page ranking 2040 that identifies user selections (clicks) of individual document results and also identifies when the user returns to the results page, thus indicating the amount of time the user spent viewing the selected document result. In other implementations, the tracking component 2050 can be a proxy system through which user selections of the document results are routed, or the tracking component can include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user.

The recorded information can be stored in the result selection log(s) 2060. The recorded information can include log entries that indicate, for each user selection, the query (Q), the document (D), the time (T) on the document, the language (L) employed by the user, and the country (C) where the user is likely located (e.g., based on the server used to access the IR system). Other information can also be recorded regarding user interactions with a presented ranking, including negative information, such as the fact that a document result was presented to a user, but was not clicked, position(s) of click(s) in the user interface, IR scores of clicked results, IR scores of all results shown before the clicked result, the titles and snippets shown to the user before the clicked result, the user's cookie, cookie age, IP (Internet Protocol) address, user agent of the browser, etc. Still further information can be recorded, such as described below during discussion of the various features that can be used to build a prior model. Moreover, similar information (e.g., IR scores, position, etc.) can be recorded for an entire session, or multiple sessions of a user, including potentially recording such information for every click that occurs both before and after a current click.

The information stored in the result selection log(s) 2060 can be used by one or more components of the information retrieval system. For example, information could be provided to the rank refiner engine 2080 and the rank modifier engine 2070 in generating the one or more signals to the ranking engine 2030. In general, a wide range of information can be collected and used to modify or tune the click signal from the user to make the signal, and the future search results provided, a better fit for the user's needs. Thus, user interactions with the rankings presented to the users of the information retrieval system can be used to improve future rankings. Additionally, language and location similarities associated with the search requester can be used to adjust rankings. In some arrangements, the user interaction and the data representing language and location similarities may be provided to one or more server systems (e.g., server system 1014) for use and storage (e.g., database 1022) for later retrieval.

The components shown in FIG. 2 can be combined in various manners and implemented in various system configurations. For example, the scoring engine 2020 and the ranking engine 2030 can be merged into a single ranking engine, such as the ranking engine 1052 of FIG. 1. The rank refiner engine 2080, the rank modifier engine 2070 and the ranking engine 2030 can also be merged, and in general, a ranking engine includes any software component that generates a ranking of document results after a query. Moreover, a ranking engine can be included in a client system in addition to (or rather than) in a server system.

Figure 3:
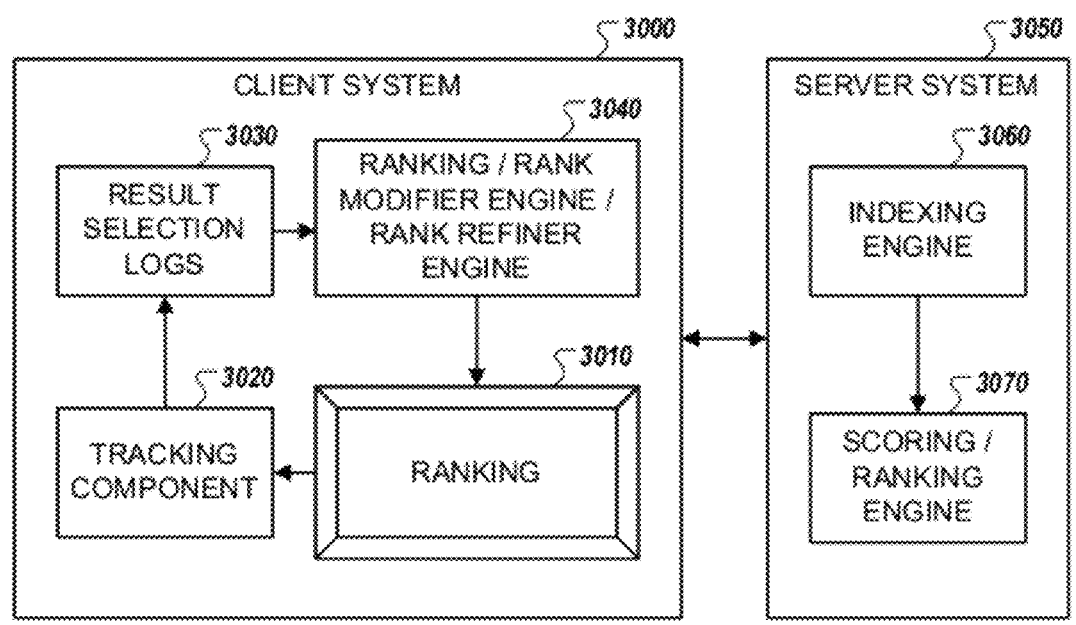
FIG. 3 shows another example information retrieval system and components.

FIG. 3 shows another example information retrieval system. In this system, a server system 3050 includes an indexing engine 3060 and a scoring/ranking engine 3070. A client system 3000 includes a user interface for presenting a ranking 3010, a tracking component 3020, result selection log(s) 3030 and a ranking/rank modifier engine/rank refiner engine 3040. For example, the client system 3000 can include a company's enterprise network and personal computers, in which a browser plug-in incorporates the ranking/rank modifier engine/rank refiner engine 3040. When an employee in the company initiates a search on the server system 3050, the scoring/ranking engine 3070 can return the search results along with either an initial ranking or the actual IR scores for the results. The browser plug-in can then re-rank the results locally based on tracked page selections for the company-specific user base.

Figure 4:
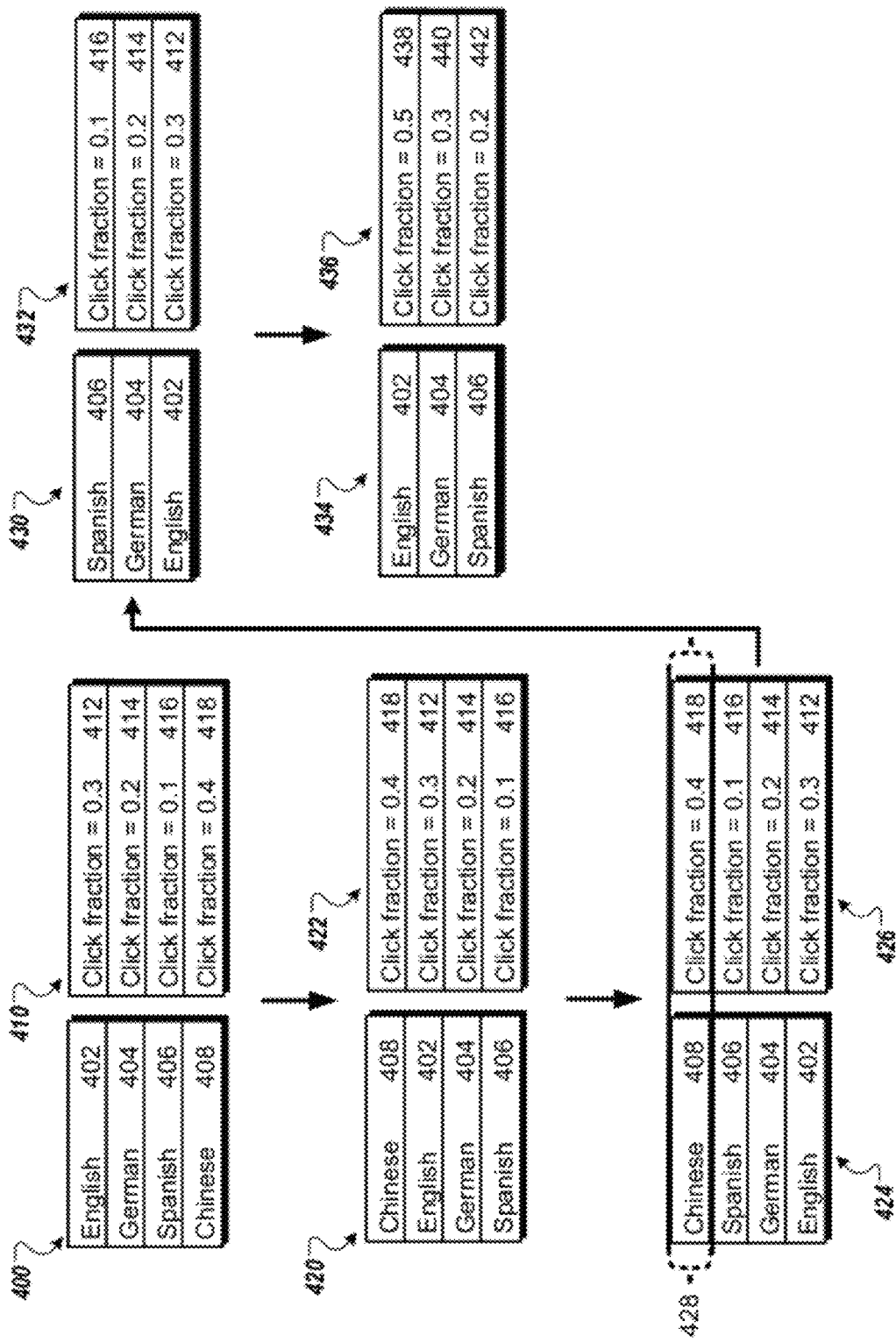
FIG. 4 illustrates refining search results.

Referring to FIG. 4, an exemplary set of search result information is used to illustrate operations of the rank refiner engine 1058. In this example, the operations are used to define a level that accounts for language similarities. For example, a search requester may be an English speaking individual that is from Germany. As mentioned, the language of the requester and the associated country of the requester may be identified from input information (e.g., search language used by the requester, etc.). Based upon the search request entered by the requester, a collection of documents are identified as possible search results that may provide the requester with sought after information. As such, the provided search query can be paired with each identified document. In this example, the entered query produces a collection of documents in a variety of languages. To exploit language similarities, the rank refiner engine 1058 processes the document collection based upon the languages detected for each query and document pair. In this illustration, for one query/document pair, a collection of language data 400 is associated with four languages (e.g., English 402, German 404, Spanish 406 and Chinese 408). For each identified language, corresponding click data is also identified for this query/document pair. From this click data, the rank refiner engine 1058 produces a metric for comparing use of the document for each language. In this arrangement, a fraction (referred to as a click fraction) is calculated for each of the identified languages. Various types of fractions may be defined and used by the rank refiner engine 1058, for example, the click fraction may represent a ratio between the number of instances that the document was selected (for that respective language) and the total number of instances that the document was selected (for all of the languages). In this example, a collection of click fractions 410 is presented adjacent to the corresponding language collection 410 (e.g., click fraction 412 for English 402, click fraction 414 for German 404, click fraction 416 for Spanish 406, and click fraction 418 for Chinese 408).

Once the collection of click fractions 410 are calculated for each language, the rank refiner engine 1058 orders the languages included in the collection 410 based upon the values of the click fractions. In this example, the click fractions are ordered in a descending manner and are presented by language collection 420 and corresponding click fraction collection 422. As indicated by the collections 420, 422, the click fraction associated with the Chinese language is the largest followed by the English, German and Spanish languages. The click data demonstrates a strong relationship between this query/document pair and the Chinese language, however, the Chinese language and the language of the query requestor (i.e., the English language) may be considered dissimilar, and some may even consider the two languages as being incompatible. As such, the click data associated with the Chinese language (from the query/document pair) may skew ranking results.

To account for language differences, the rank refiner engine 1058 may adjust the language collection 420 and the corresponding click data collection 422 to separate languages considered incompatible (with the language of the requester) and languages considered compatible (with the language of the requester). In this example, the rank refiner engine 1058 produces language collection 424 and corresponding click fraction collection 426. As illustrated, languages considered incompatible (e.g., Chinese language 408) by the rank refiner engine 1058 are placed at the head of the language collection 424 and languages considered compatible (e.g., English 402, German 404 and Spanish 406) are positioned toward the tail of the language collection 424. The rank refiner engine 1058 correspondingly adjusts the click fraction information to produce click fraction collection 426.

Along with re-arranging the language data based upon compatibility, the rank refiner engine 1058 also adjusts the language data. In this example, the rank refiner engine 1058 has identified an incompatible language (e.g., Chinese) with a considerable click fraction. To reduce the effects of this incompatible language click fraction (e.g., on document scoring and ranking), the rank refiner engine 1058 may adjust the click fraction or remove the language entry in its entirety. For example, one or more weights may be applied to the click fractions such that the significance of incompatible languages is noticeably reduced. References to incompatible languages (and associated data), as defined by the rank refiner engine 1058, may also be removed from the collections. In this particular example, the rank refiner engine 1058 identifies the incompatible languages at the head of the language collection 424 and removes the identified languages from the collection along with the corresponding click fraction information from the click fraction collection 426. As indicated by brackets 428, for this example, the information associated with the incompatible language (Chinese) is removed from both collections 424 and 426. In some arrangements, other techniques may be used to identify information for removal. For example, click fractions for one or a few languages may be significantly statistically different (e.g., larger) from click fractions associated with the majority of other languages. Based upon this significant difference in click fraction, the language (or languages) associated with the outlier click fractions may be removed from the language collection 424.

Once the incompatible language information has been removed, collection information of a reduced size remains. In this example, a language collection 430 and a corresponding click fraction collection 432 with three entries each remain. Similar to the previous collections, for this query/document pair, the number of instances that the document has been selected (or another type of click data) for each language and the total number of instances that the document has been selected is determined by the rank refiner engine 1058. From the data associated with remaining languages, the rank refiner engine 1058 re-orders the languages for this query/document pair. For example, click fractions may be re-calculated for each of the remaining languages, and the languages may be re-ordered based on the re-calculated click fractions. In this particular example, a language collection 434 and a click fraction collection 436 illustrate the re-calculated click fractions (e.g., click fraction 438, click fraction 440 and click fraction 442) for the remaining languages (e.g., English, German and Spanish).

For each document associated with the query, similar operations may be executed by the rank refiner engine 1058. By computing similar data for each document, quantities may be calculated for scoring and ranking the documents. For example, the click data associated with the remaining languages for this query/document pair may be summed to provide the click count for the document. Similar quantities may be calculated for each document. By summing the click counts for each document (for the remaining languages) a click count may be determined for the query (for the remaining languages). Similarly, a fraction can be computed for each document, for example, from the ratio of the two sums (e.g., a ratio of the sum of click count for the document for the remaining languages and the sum of the click counts for the query).

One or more techniques may be used to exploit the language compatibility to define a level. In one arrangement, a level may be defined from the quantity:

$$LD*B+(1-LD)*L+;$$

where B represents the total number amount of click data (e.g., selections) independent of language and L+ represents the amount of click data (e.g., selections) for a specific language or languages after accounting for possible languages incompatibilities (e.g., as represented in the language collection 434 and the click fraction collection 436). The quantity LD (referring to as language demotion score) is a measure of a user's ability to understand the corresponding document. For example, LD may have a range from 0 (e.g., represents a low probability that the language of the user is compatible with the language of the document) to 1.0 (e.g., represents a high probability that the language of the user is compatible with the language of the document). Once computed, the quantity may be provided to one or more components (e.g., rank modifier engine 1056, ranking engine 1052, indexing engine 1020) and used as a factor in ranking the documents associated with the query. One or more weights may also be used with the computed quantity for scoring and ranking. For example, click data associated with particular countries and country independent click data may be utilized. Click data associated with particular languages and language independent click data may also be provided to one or more components (individually or in combination with the click data associated with one or more countries) for use in determining document scores and rankings.

While the previous example illustrated in FIG. 4 is associated with a plurality of languages (and associated click fractions) for query/document pairs, the technique may also be used for other characteristics associated with a search requester. For example, rather than refining the query/document pair information based upon of plurality of languages (associated with each query/document pair), click data associated with a plurality of countries may be used for refining query/document pair information. Further, the rank refiner engine 1058 may use the click data (e.g., click fractions) in a similar manner based upon country compatibility (rather than language compatibility). As such, the click data from similar countries, as defined by the rank refiner engine 1058, may be exploited for scoring and ranking particular documents. For example, similar to language compatibility, country compatibility a level may be defined by the quantity:

$$L*CD+(1-CD)*C+;$$

where the quantity CD (referring to as country demotion score) is a measure of a user's ability to understand a document based upon the country of the user and the country of the document. Similar to L+, C+ is determined by producing and ordered list that includes, for example, click data (e.g., click fractions) of countries that are compatible to the country of the user. For example, countries in the same general proximity (e.g., bordering countries such as Mexico and the United States) may be considered by the rank refiner engine 1058 to be compatible. Countries that share similar cultures, climates, and other characteristics may also be considered to be compatible. In this quantity, L represents the click data associated with the language of the user.

In the illustrated example, levels are defined to account for compatibilities among user languages and locations. As such, these additional levels may be used to exploit user interactions (e.g., click data) so the ranking of particular search results may be enhanced. Additional types of levels may also be defined for enhancing search result ranking, for example, user locations such as regions of a country, individual cities and metropolitan regions may be used for defining compatibilities. In one instance, a level may be defined to account for the different languages that are used in a single country (associated with a user). For example, a query is identified as being provided from an English speaking individual from Germany. Operating with a level that is associated with both the language and the country of the user, a relatively small amount of previous queries (that are similar to the current query) may be detected, for this example. As such, another level may be activated for identifying similar queries. For example, the level that uses queries from all English speaking individuals (including individuals from other countries) may be used. However, such an abrupt change in level types may discount query information associated with different user languages (e.g., German) but from the same location (e.g., Germany), and which may be pertinent to the subject query. As such, a level may be defined that uses queries and user information associated with multiple languages used at a particular country. In this example, along with information associated with English speaking users, information (e.g., queries, click data) associated with German speaking individuals, French speaking individuals (and other languages used in Germany) are exploited.

One or more techniques and methodologies may be implemented to account for user information associated with various languages from a single country. For example, for each document (from a query), the rank refiner engine 1058 may collect click data for each language associated with the user's country (e.g., for an English speaking user in Germany, click data is also collected from Germany speaking individuals, French speaking individuals, etc.). Once collected, the rank refiner engine 1058 may process the click data, for example, one or more weights may be applied to the click data associated with each language. Constraints may also be applied to the weighted or un-weighted click data, for example, the click data may be constrained to one or more limits (e.g., an upper limit, a lower limit, etc.). The rank refiner engine 1058 may use the processed click data to define one or more levels. For example, the processed click data may be used in combination with click data associated with the language and country of the user to define a level. In one instance, the level may be defined with the quantity:

$$C+LD*C*;$$

where C represents the click data associated with the language and country of the user. As used above, the quantity LD refers to language demotion score and is a measure of a user's ability to understand the corresponding document. For example, LD may have a range from 0 (e.g., representative of a low probability that the language of the user is compatible with the language of the document) to 1.0 (e.g., representative of a high probability that the language of the user is compatible with the language of the document). The quantity $C*$ represents the processed click data for each of the languages associated with the country of the user. By applying the language demotion score to the quantity $C*$, local documents (e.g., German documents in this example) that are relevant may be promoted.

Figure 5:
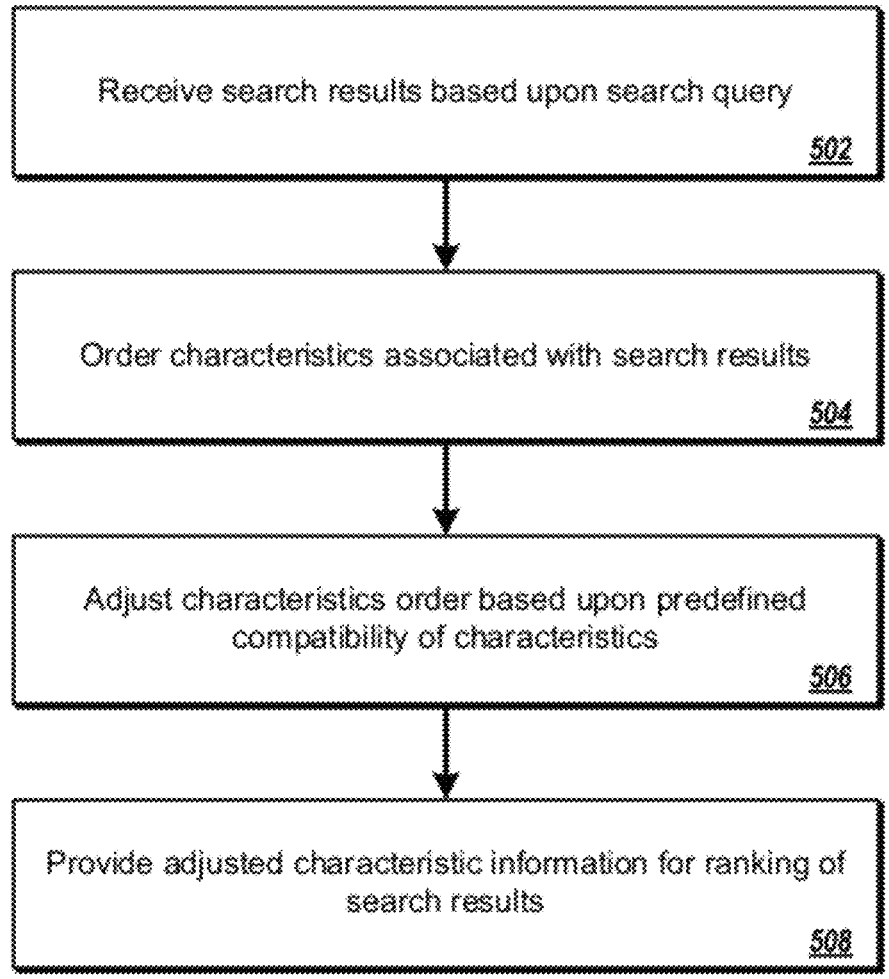
FIGS. 5 and 6 show flowcharts that represent operations of a rank refiner engine.

Referring to FIG. 5, a flowchart 500 represents some operations of a rank refiner engine (such as the rank refiner engine 1058 shown in FIG. 1). The operations may be executed by a single computing device (such as the server system 1014 shown in FIG. 1) that includes a search engine. In some arrangements, multiple computing devices may also be utilized. Along with being executed at a single site (e.g., server system 1014), operation execution may be distributed among two or more sites (e.g., server system 1014 and client 1004).

Among other capabilities, the rank refiner engine 1058 may use predefined compatibilities associated with characteristics of a search requester (e.g., location of the search requester, language used, etc.) to refine search results. To provide this functionality, the rank refiner engine 1058 may execute operations such as receiving 502 search results based upon a search query. In one example, for each document provided from a search query, click data may be provided to the rank refiner engine 1058 that is associated with previous queries from users with similar characteristics (e.g., language used, location, etc.). Operations of the rank refiner engine 1058 may also include ordering 504 the characteristics associated with the search results. For example, the languages or countries associated with a search results may be ordered based upon the click data associated with each corresponding characteristic. Once ordered, the rank refiner engine 1058 may adjust 506 the ordered characteristics based upon one or more predefined compatibilities associated with the characteristics. For example, two or more particular languages may be considered compatible based upon similarities of the languages. Similarly, two or more countries may be considered compatible based upon similarities (e.g., similar geographic location, culture, climate, etc.). In some arrangements, some data associated a particular search results (e.g., click data associated with languages considered incompatible) may be removed or weighted to decrease its significance. Operations of the rank refiner engine 1058 may also include providing 508 the adjusted characteristic information for further processing of the search results (e.g., scoring, ranking, etc.). For example, the information may be used to define one or more levels for processing results such that certain types of search results are promoted.

Figure 6:
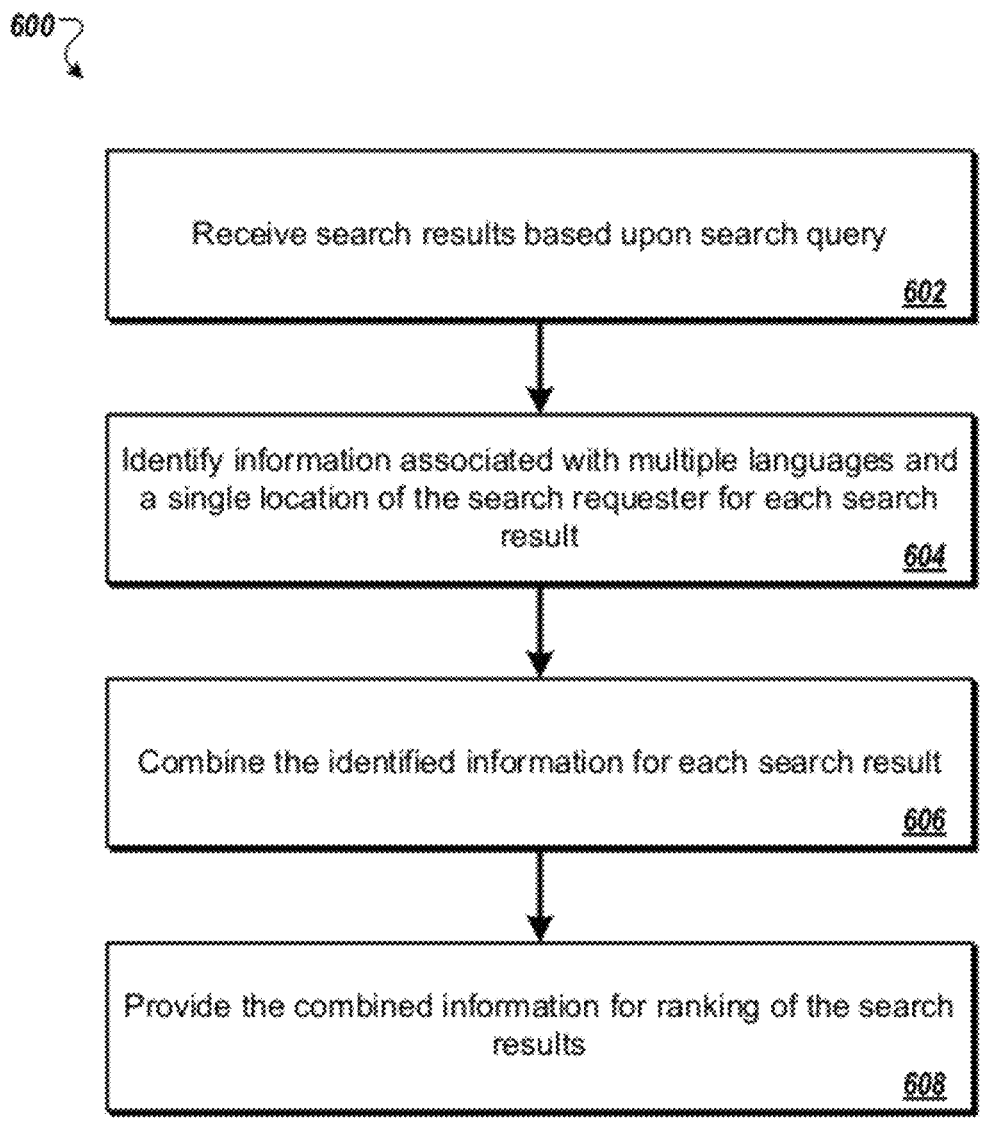

Referring to FIG. 6, a flowchart 600 represents other operations of a rank refiner engine (such as the rank refiner engine 1058 shown in FIG. 1). Similar to the operations associated with flowchart 500 of FIG. 5, the operations may be executed by a single computing device (such as the server system 1014 shown in FIG. 1) that includes a search engine. In some arrangements, multiple computing devices may also be utilized. Along with being executed at a single site (e.g., server system 1014), operation execution may be distributed among two or more sites (e.g., server system 1014 and client 1004).

The rank refiner engine 1058 may define a level for ranking search results that assists promoting local documents identified from the search results. For example, click data associated with multiple (or all) languages used at the location of the search requester may be exploited. To provide this functionality, the rank refiner engine 1058 may execute operations such as receiving 602 search results that are based upon a query from a search requestor at a particular location. Operations of the rank refiner engine 1058 may also include identifying information associated with similar queries (e.g., click data) that is associated with multiple languages used at the location of the search requester. Once identified, the rank refiner engine 1058 may process this information for promoting search results (e.g., documents) that are local to the search requester based upon the languages associated with the location. For example, the rank refiner engine 1058 may combine 606 appropriate information (e.g., click data) associated with the multiple languages for each search result and provide 608 the information for ranking the search results. By using this combination of information, the rank refiner engine 1058 may assist in defining a level of ranking search results to promote local search results (e.g., documents) that may be more relevant to a search requester than foreign search results.

Figure 7:
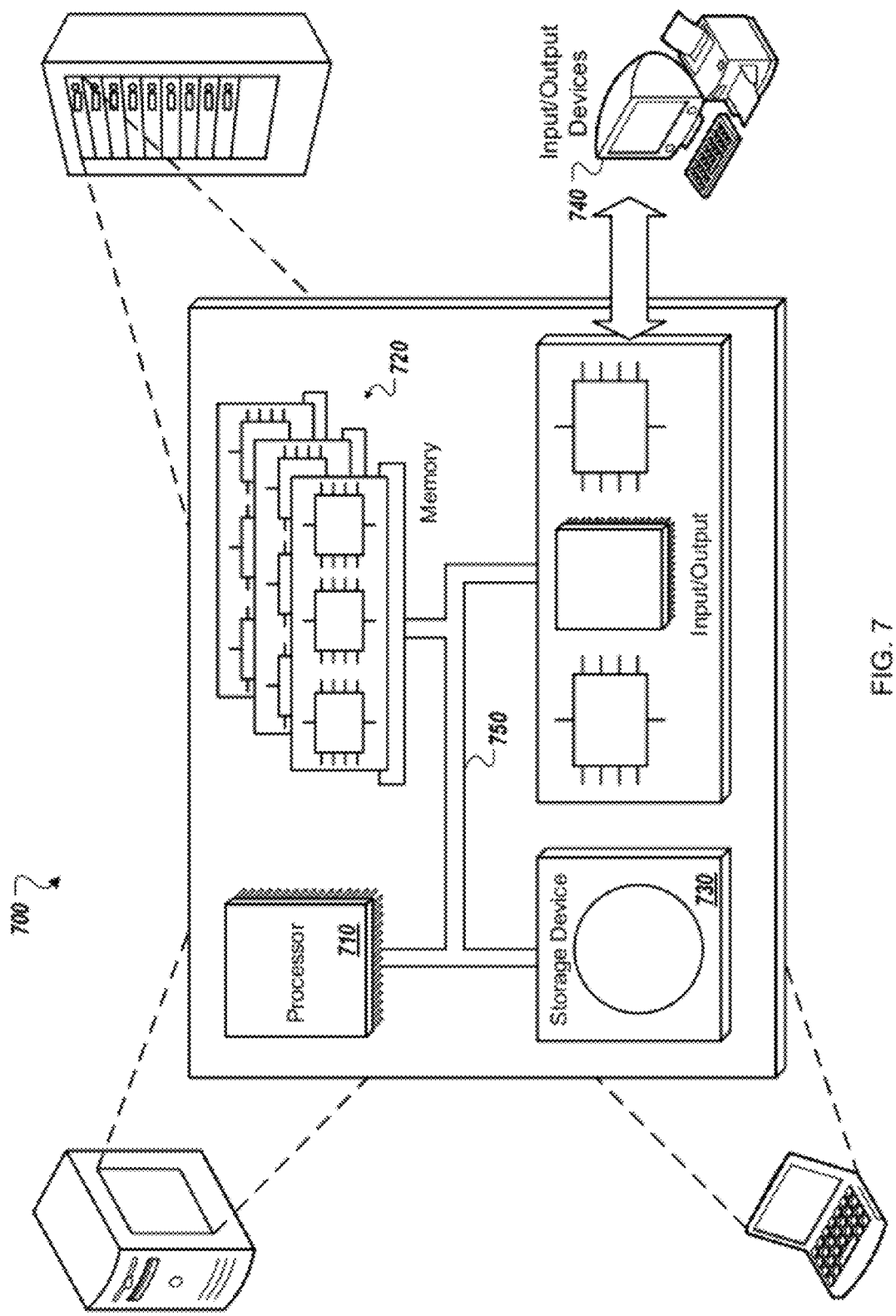
FIG. 7 shows a schematic diagram of an example computer system.

FIG. 7 is a schematic diagram of an example computer system 700. The system 700 can be used for practicing operations described above. The system 700 can include a processor 710, a memory 720, a storage device 730, and input/output devices 740. Each of the components 710, 720, 730, and 740 are interconnected using a system bus 750. The processor 710 is capable of processing instructions within the system 700. These instructions can implement one or more aspects of the systems, components and techniques described above. In some implementations, the processor 710 is a single-threaded processor. In other implementations, the processor 710 is a multi-threaded processor. The processor 710 can include multiple processing cores and is capable of processing instructions stored in the memory 720 or on the storage device 730 to display graphical information for a user interface on the input/output device 740.

The memory 720 is a computer readable medium such as volatile or non volatile that stores information within the system 700. The memory 720 can store processes related to the functionality of the search engine 1030 (shown in FIG. 1), for example. The storage device 730 is capable of providing persistent storage for the system 700. The storage device 730 can include a floppy disk device, a hard disk device, an optical disk device, or a tape device, or other suitable persistent storage mediums. The storage device 730 can store the various databases described above. The input/output device 740 provides input/output operations for the system 700. The input/output device 740 can include a keyboard, a pointing device, and a display unit for displaying graphical user interfaces.

The computer system shown in FIG. 10 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, the server environment, which is configured to provide electronic search service and employ the ranking systems and techniques described, need not be implemented using traditional back-end or middleware components. The server environment can be implemented using a program installed on a personal computing apparatus and used for electronic search of local files, or the server environment can be implemented using a search appliance installed in an enterprise network.

Other implicit user feedback models can be used in place of the traditional click fraction model described. For example, an implicit user feedback model employing a large-scale logistic regression model that uses the actual query and url as features can be used. The new prior models can be used to denormalize any query-specific click model.

In addition, the prior model(s) can be applied in varying manners. For example, a prior model can be applied at run time as an adjustment to the ranking boost given to a document in accordance with the implicit user feedback model since the set of features used for the prior model can be available for direct input at run time. Alternatively, the prior model can be applied at model building time, where features are fetched from the log(s), which can result in improved response time during searches. In addition, when the model is applied at building time, the implicit feedback can be adjusted per each click record before aggregating the feedback from multiple clicks into a signal. This adjustment can be for instance a weighting of the clicks according to how much they were affected by display bias before the clicks are aggregated. At run time, the signal is typically only adjusted after the clicks were already aggregated, which can result in some loss of precision.

What is claimed is:

1. A computer-implemented method comprising:
   obtaining a plurality of search results responsive to a search query submitted by a user, wherein each search result refers to a respective document that is associated with a respective plurality of click measures, each click measure relating to a different respective natural language and representing, at least, a measure of behavior of users associated with the respective language in regards to the document when the document was referred to in a search result previously provided in response to the search query;
   for each of a first plurality of the search results, reducing the click measure associated with the document referred to by the search result, wherein the click measure relates to a respective natural language that is incompatible with a natural language of the user;
   calculating a respective scoring factor for each of the first plurality of search results based on the respective click measures associated with the document referred to by the first search result; and
   ranking the search results based upon, at least, the calculated scoring factors.

2. The method of claim 1 wherein calculating the scoring factor further comprises weighting a combination of the respective click measures for the document by a weight that represents the user's ability to understand the document.

3. The method of claim 1 wherein the users are located in a same country as the user.

4. The method of claim 1 wherein a plurality of the users are located in a different country than the user.

5. The method of claim 4 wherein calculating the scoring factor further comprises weighting a combination of the respective click measures for the document by a weight that represents a measure of the user's ability to understand the document based on the country of the user and a country of the document.

6. The method of claim 1 wherein calculating the scoring factor further comprises summing the respective click measures for the document.

7. The method of claim 1 wherein calculating the scoring factor further comprises calculating a ratio of a sum of the respective click measures for the document and a sum of click counts for the query.

8. The method of claim 1 wherein the respective click measure is a ratio of a number of instances that the document was selected for the respective natural language and a number of instances that document was selected for all of the respective natural languages.

9. The method of claim 1 wherein reducing the respective click measure comprises eliminating the click measure.

10. The method of claim 1, further comprising determining that the respective natural language is incompatible with the natural language of the user based on, at least, analysis of search queries submitted by users in different countries.

11. A system comprising:
    one or more processors programmed operable to perform operations comprising:
       obtaining a plurality of search results responsive to a search query submitted by a user, wherein each search result refers to a respective document that is associated with a respective plurality of click measures, each click measure relating to a different respective natural language and representing, at least, a measure of behavior of users associated with the respective language in regards to the document when the document was referred to in a search result previously provided in response to the search query;
       for each of a first plurality of the search results, reducing the click measure associated with the document referred to by the search result, wherein the click measure relates to a respective natural language that is incompatible with a natural language of the user;
       calculating a respective scoring factor for each of the first plurality of search results based on the respective click measures associated with the document referred to by the first search result; and
       ranking the search results based upon, at least, the calculated scoring factors.

12. The system of claim 11 wherein calculating the scoring factor further comprises weighting a combination of the respective click measures for the document by a weight that represents the user's ability to understand the document.

13. The system of claim 11 wherein the users are located in a same country as the user.

14. The system of claim 11 wherein a plurality of the users are located in a different country than the user.

15. The system of claim 14 wherein calculating the scoring factor further comprises weighting a combination of the respective click measures for the document by a weight that represents a measure of the user's ability to understand the document based on the country of the user and a country of the document.

16. The system of claim 11 wherein calculating the scoring factor further comprises summing the respective click measures for the document.

17. The system of claim 11 wherein calculating the scoring factor further comprises calculating a ratio of a sum of the respective click measures for the document and a sum of click counts for the query.

18. The system of claim 11 wherein the respective click measure is a ratio of a number of instances that the document was selected for the respective natural language and a number of instances that document was selected for all of the respective natural languages.

19. The system of claim 11 wherein reducing the respective click measure comprises eliminating the click measure.

20. The system of claim 11 wherein the operations further comprise determining that the respective natural language is incompatible with the natural language of the user based on, at least, analysis of search queries submitted by users in different countries.

21. A computer readable medium having instructions stored thereon that, when executed by one or more processors, causes the one or more processors to perform operations comprising:
obtaining a plurality of search results responsive to a search query submitted by a user, wherein each search result refers to a respective document that is associated with a respective plurality of click measures, each click measure relating to a different respective natural language and representing, at least, a measure of behavior of users associated with the respective language in regards to the document when the document was referred to in a search result previously provided in response to the search query;
for each of a first plurality of the search results, reducing the click measure associated with the document referred to by the search result, wherein the click measure relates to a respective natural language that is incompatible with a natural language of the user;
calculating a respective scoring factor for each of the first plurality of search results based on the respective click measures associated with the document referred to by the first search result; and
ranking the search results based upon, at least, the calculated scoring factors.

22. The computer readable medium of claim 21 wherein calculating the scoring factor further comprises weighting a combination of the respective click measures for the document by a weight that represents the user's ability to understand the document.

23. The computer readable medium of claim 21 wherein the users are located in a same country as the user.

24. The computer readable medium of claim 21 wherein a plurality of the users are located in a different country than the user.

25. The computer readable medium of claim 24 wherein calculating the scoring factor further comprises weighting a combination of the respective click measures for the document by a weight that represents a measure of the user's ability to understand the document based on the country of the user and a country of the document.

26. The computer readable medium of claim 21 wherein calculating the scoring factor further comprises summing the respective click measures for the document.

27. The computer readable medium of claim 21 wherein calculating the scoring factor further comprises calculating a ratio of a sum of the respective click measures for the document and a sum of click counts for the query.

28. The computer readable medium of claim 21 wherein the respective click measure is a ratio of a number of instances that the document was selected for the respective natural language and a number of instances that document was selected for all of the respective natural languages.

29. The computer readable medium of claim 21 wherein reducing the respective click measure comprises eliminating the click measure.

30. The computer readable medium of claim 21 wherein the operations further comprise determining that the respective natural language is incompatible with the natural language of the user based on, at least, analysis of search queries submitted by users in different countries.

* * * * *

UNITED STATES PATENT AND TRADEMARK OFFICE
CERTIFICATE OF CORRECTION

PATENT NO. : 8,498,974 B1
APPLICATION NO. : 12/551052
DATED : July 30, 2013
INVENTOR(S) : Hyung-Jin Kim It is certified that error appears in the above-identified patent and that said Letters Patent is hereby corrected as shown below:

Title Page 3, item (56), Column 1 (U.S. Patent Documents), after line 42, please add new line 43 to add omitted reference:
"2011/0064796    A1    3/17/2011    Tosi et al."

Title Page 3, item (56), Column 1 (Other Publications), line 7, please delete "Nov. 2, 2006, filed" and insert therefor -- filed Nov. 2, 2006 --;

Title Page 3, item (56), Column 2 (Other Publications), line 12, please delete "Dentification" and insert therefor -- Identification --;

Title Page 3, item (56), Column 2 (Other Publications), line 43, please delete "Complilation" and insert therefor -- Compilation --;

Title Page 4, item (56), Column 1 (Other Publications), line 49, please delete "0" and insert therefor -- © --;

Title Page 4, item (56), Column 1 (Other Publications), line 68, please delete "Unobstrusive" and insert therefor -- Unobtrusive --;

Title Page 4, item (56), Column 2 (Other Publications), line 30, please delete "Hepler" and insert therefor -- Helper --;

In the Claims:

Column 16, line 31, Claim 11, after "programmed", please delete "operable".

Signed and Sealed this
Fifth Day of November, 2013

Teresa Stanek Rea
*Deputy Director of the United States Patent and Trademark Office*